C. KRÄMER.
POWER TRANSMISSION SYSTEM.
APPLICATION FILED MAY 15, 1912.
1,041,103.
Patented Oct. 15, 1912.
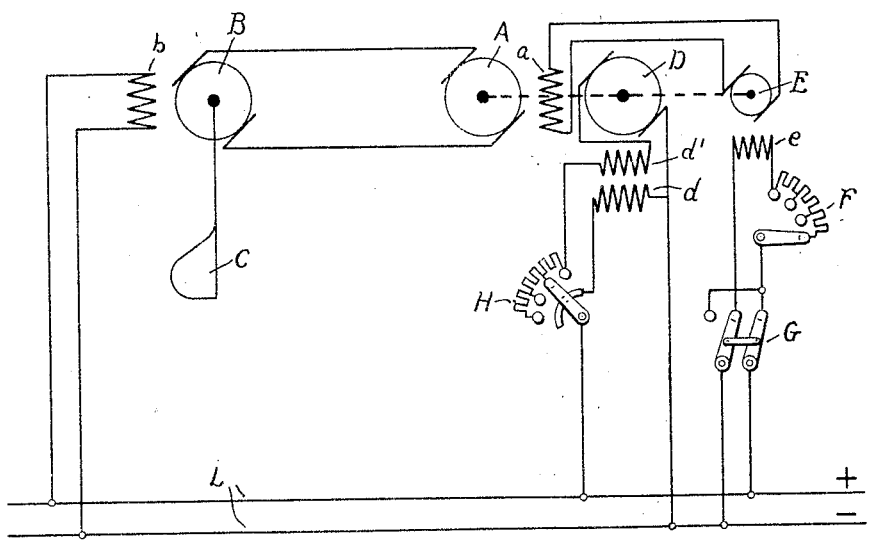
WITNESSES:
INVENTOR:
CHRISTIAN KRÄMER,
BY
HIS ATTORNEY.

UNITED STATES PATENT OFFICE.

CHRISTIAN KRÄMER, OF BERLIN, GERMANY, ASSIGNOR TO GENERAL ELECTRIC COMPANY, A CORPORATION OF NEW YORK.

POWER-TRANSMISSION SYSTEM.

1,041,103.  Specification of Letters Patent.  Patented Oct. 15, 1912.

Application filed May 15, 1912. Serial No. 697,436.

*To all whom it may concern:*

Be it known that I, CHRISTIAN KRÄMER, a subject of the Emperor of Germany, residing at Berlin, Germany, have invented certain new and useful Improvements in Power-Transmission Systems, of which the following is a specification.

My invention relates to power transmission systems and is particularly applicable to such systems in which a generator driven by a motor supplies current to a translating device. It is often desirable in such a system that the voltage of the generator shall fall with increasing load on the translating device, so that the amount of energy consumed may not exceed a predetermined value. This is particularly desirable when the translating device drives an anchor-capstan, a steering rudder, or any load of like character, because a much smaller machine can then be used. Heretofore a strongly under-compounded generator running at constant speed has been used for lowering the voltage of the generator with increasing load on the translating device supplied thereby. Such an arrangement however limits the output of the generator and causes the generator to commutate poorly.

My invention has for its object to obviate these disadvantages and to obtain the reduction of the voltage of the generator as a function of the output.

To this end, my invention consists in using in a transmission system as described above, a compound-wound motor to drive the generator which supplies the translating device and also to drive an exciter which supplies the field excitation of the generator.

For a better understanding of my invention, reference may be had to the following description taken in connection with the accompanying drawing, in which the single figure shows diagrammatically a transmission system in accordance with my invention.

Referring to the drawing, A is a generator having a field winding $a$ and supplying current to a translating device or motor B having a field winding $b$. The motor B is shown as being operatively connected to a rudder C. The generator A is driven by a compound wound motor D having a shunt field winding $d$ and a cumulative series field winding $d'$. The motor D also drives an exciter E which has a field winding $e$. The exciter E supplies the field excitation of the generator A, and its armature is shown as being connected directly to the field winding $a$ of the generator A. A source of direct current is connected to mains L, to which the motor D is connected. I have also shown the field winding $b$ of motor B, the field winding $e$ of exciter E and the field winding $d$ of the motor D connected to the mains L. The speed of the motor B is preferably controlled by varying the voltage supplied to it. I have shown a rheostat F and a reversing switch G in the circuit of the field winding $e$, by means of which the magnitude and direction of the voltage of the exciter E are controlled. By thus controlling the exciter voltage, the field excitation of the generator A is controlled, and consequently the voltage supplied the motor B. If desired, the rheostat F and the reversing switch G may be placed in the circuit of the field winding $a$. A rheostat H is shown in the circuit of the motor D for starting the motor.

It is well known that the torque required to move a rudder varies considerably with the position of the rudder. Assume that the torque varies in the ratio of 1 to 10. In this case, the shunt field winding $d$ and the series field winding $d'$ are so proportioned that at full load the motor D runs at one-third its no-load speed. If the motor D is then operating at full load, the exciter E and the generator A both run at one-third their normal speeds. The exciter will then give only one-third its normal voltage and the field winding $a$ of the generator A has only one-third its normal excitation. The generator A however is also running at only one-third of its normal speed, and consequently generates one-ninth of its no-load voltage. If the rudder requires a large torque to move it, the motor B will take a large current from the generator A, but its voltage will be greatly reduced as explained above. Since voltage times current equals power, the power demanded of the generator A is far less than would be required if the voltage of the generator did not decrease automatically.

The ratio of shunt to series turns of the field windings of the motor D must be chosen for each case, depending upon the variation of the torque of the motor B.

What I claim as new and desire to secure by Letters Patent of the United States, is,—

1. In a system of power transmission, a compound-wound motor, a source of current supplying said motor, a generator and an exciter driven by said motor, said exciter supplying the field excitation of said generator, and a translating device supplied with current from said generator and driving a variable load.

2. In a system of power transmission, a motor having a shunt and a cumulative series field winding, a source of current supplying said motor, a generator and an exciter driven by said motor, said exciter supplying the field excitation of said generator, a translating device supplied with current from said generator and driving a variable load, and means for controlling the speed of said translating device by varying the voltage supplied thereto.

In witness whereof, I have hereunto set my hand this 29th day of April, 1912.

CHRISTIAN KRÄMER.

Witnesses:
RICHARD NEUMANN,
WALTHER REINHARDT.

---

Copies of this patent may be obtained for five cents each, by addressing the "Commissioner of Patents, Washington, D. C."